United States Patent [19]

Bryg et al.

[11] Patent Number: 5,060,137
[45] Date of Patent: Oct. 22, 1991

[54] EXPLICIT INSTRUCTIONS FOR CONTROL OF TRANSLATION LOOKASIDE BUFFERS

[75] Inventors: William R. Bryg, Saratoga; Michael E. Gardner, Sunnyvale; Steven C. Boettner, San Jose, all of Calif.

[73] Assignee: Hewlett-Packard Company, Palo Alto, Calif.

[21] Appl. No.: 229,750

[22] Filed: Aug. 3, 1988

Related U.S. Application Data

[63] Continuation of Ser. No. 750,390, Jun. 28, 1985, abandoned.

[51] Int. Cl.⁵ .................... G06F 12/10; G06F 12/08
[52] U.S. Cl. .................... 364/200; 364/255.1; 364/256.5
[58] Field of Search ... 364/200 MS File, 900 MS File

[56] References Cited

U.S. PATENT DOCUMENTS

| 4,068,303 | 1/1978 | Morita | 364/200 |
| 4,551,797 | 11/1985 | Amdahl et al. | 364/200 |
| 4,581,702 | 4/1986 | Saroka et al. | 364/200 |
| 4,604,688 | 8/1986 | Tone | 364/200 |
| 4,612,612 | 9/1986 | Woffinden et al. | 364/200 |
| 4,628,451 | 12/1986 | Sawada et al. | 364/200 |
| 4,682,281 | 7/1987 | Woffinden et al. | 364/200 |
| 4,731,740 | 3/1988 | Eguchi | 364/200 |
| 4,774,653 | 9/1988 | James | 364/200 |
| 4,794,521 | 12/1988 | Ziegler et al. | 364/200 |

Primary Examiner—Thomas C. Lee
Assistant Examiner—Ayni Mohamed
Attorney, Agent, or Firm—Roland I. Griffin; Alan H. Haggard

[57] ABSTRACT

Explicit instructions are provided that enable software to directly control insertion of information into a translation lookaside buffer (TLB). A first pair of instructions enable information to be inserted into a data TLB and a second pair of instructions enable information to be inserted into an instruction TLB. In each of these pairs, the first instruction inserts the virtual address and the associated physical address. In response to the second instruction of each of these pairs, additional information about that physical page, such as protection information and flags, is inserted.

7 Claims, 5 Drawing Sheets

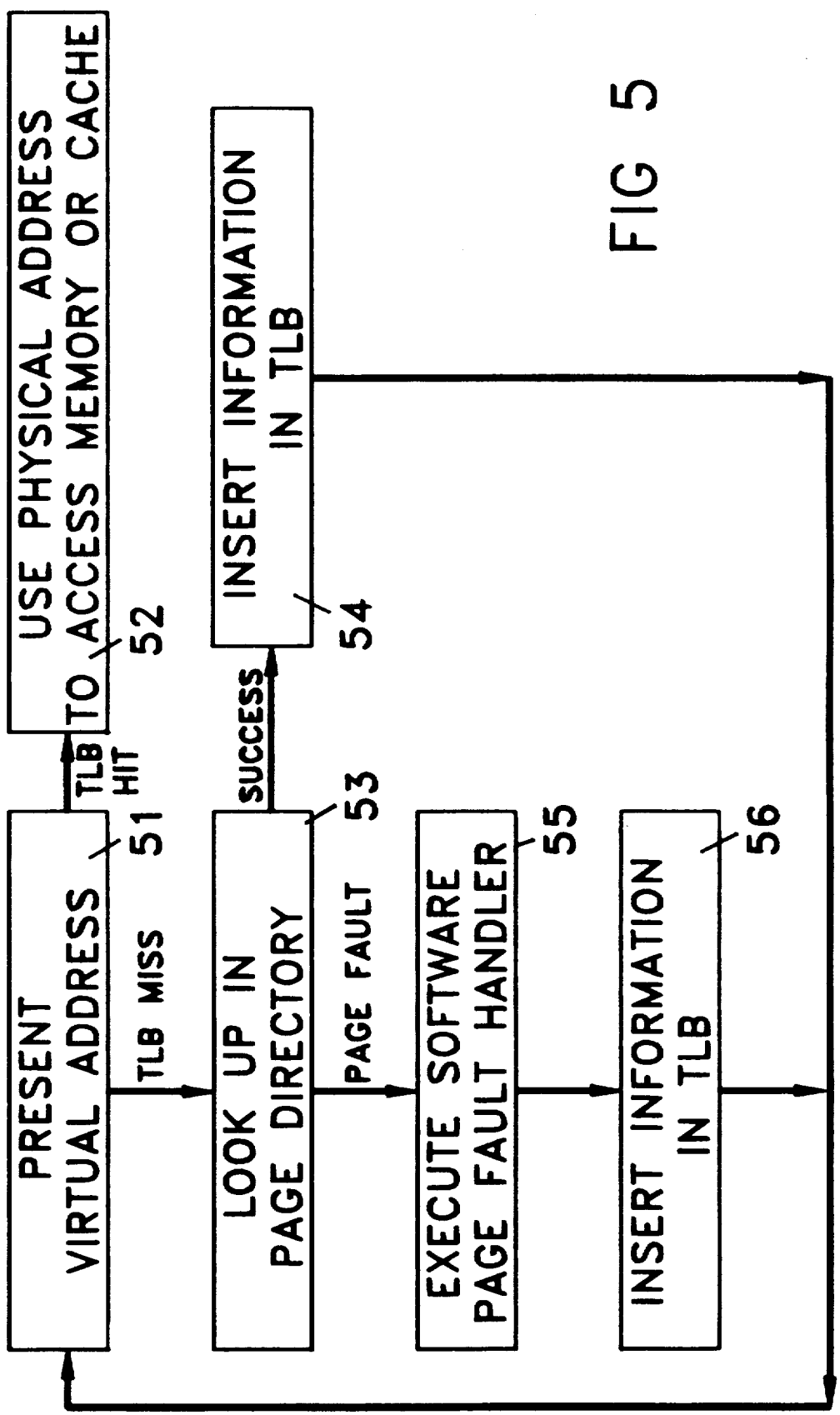

5,060,137

EXPLICIT INSTRUCTIONS FOR CONTROL OF TRANSLATION LOOKASIDE BUFFERS

CROSS REFERENCE TO RELATED APPLICATION

This application is a continuation of application Ser. No. 06/750,390, filed 06/28/85, now abandoned.

BACKGROUND AND SUMMARY OF THE INVENTION

The disclosed invention relates in general to computers utilizing virtual addresses and physical addresses and relates more particularly to computers that utilize translation lookaside buffers (TLBs) in the translation of virtual addresses to physical addresses. In a computer environment, virtual addresses are utilized by the software to reference instructions and data whereas physical addresses are the actual physical locations in memory where the instructions and data are stored. The utilization of both types of addresses requires that there be a translation from virtual addresses to physical addresses so that an address referenced in software will result in access of the associated physical address.

In general, the space of virtual addresses will be much larger than the space of physical addresses. The virtual address and physical address spaces are typically divided into equal size blocks of memory called pages so that the translation from virtual address to physical address involves a translation of virtual page numbers to physical page numbers. A page directory (PDIR) provides the translation between virtual addresses and physical addresses. The page directory contains an entry for every physical page number that has been associated with a virtual page number. Therefore, direct use of the page directory to perform the translations is typically too slow. In order to increase the speed of translation, many computers utilize a cache memory referred to as a translation lookaside buffer (TLB) to assist in the translation of virtual addresses to physical addresses.

An advantage of cache memory is that a memory access to it is typically much faster than a memory access to main memory. Typically, this increased access speed requires that the cache memory be small. In many cases, the TLB cannot contain the entire page directory so that procedures need to be implemented to update the TLB. When a virtual page is accessed that is not in the TLB, the page directory is accessed to determine the translation of this virtual page number to a physical page number and this information is entered into the TLB. Access to the page directory can take on the order of fifty times longer than access to the TLB and therefore program execution speed is optimized by keeping the translations being actively utilized in the TLB.

In many systems, the physical memory consists of a backing memory (such as disc memory or tape memory), main memory and cache memory. The backing memory is typically larger than the main memory, thereby enabling larger programs to be implemented than if only main memory were available. Depending on the length of a program and on the competition with other programs for the main memory, part or all of a program is loaded into main memory at a given time. Only part of the program segment in main memory can be loaded from main memory into the cache memory. Memory caches are based on the assumption that, because a particular memory location has been referenced, that location and locations very close to it are very likely to be accessed in the near future. This property is referred to as locality. Therefore, the cache will contain data that was recently referenced and the TLB will contain translations associated with those pages.

In FIG. 1 is illustrated the response to the presentation (step 11) of a virtual address during program execution. If the translation for that virtual address is in the TLB (referred to as a TLB hit), then the associated physical address is derived from the TLB and is utilized to access physical memory (step 12). If the translation for that virtual address is not in the TLB (referred to as a TLB miss), then the translation for that virtual address is sought in the page directory (step 13). If the translation is in the page directory, then this information is inserted into the TLB (step 14) and the virtual address is again presented (step 11). This time we are assured of a TLB hit so that the resulting physical address is used to access physical memory.

If the virtual address is in a page of virtual addresses for which no page of physical addresses is associated, then there will be no entry for this page in the page directory. Such an occurrence is called a page fault. In response to a page fault, the virtual page that is referenced is assigned a physical page (step 15) and this information is inserted into the page directory. If all physical pages had already been associated with other virtual pages, then the page fault handler needs to select which of the physical pages to reassign to the virtual address page currently being referenced. There are many algorithms for such a choice including first-in-first-out and least-recently-used algorithms. Because this entire process is more complicated than those routines typically implemented in microcode, the page fault handler is typically implemented in software. Microcode is typically kept simple so that it can fit into the relatively small and fast memories utilized to store microcode.

After completion of the page fault handler routine, the virtual address is again presented (step 11). The TLB does not yet have the translation so that there will be a TLB miss. Therefore, the translation is looked up in the page directory (step 13), the translation is inserted into the TLB (step 14) and the virtual address is presented for a third time (step 11). This time a TLB hit is assured so that the resulting physical address is used to access physical memory.

The above procedure has the disadvantage that it requires accessing the page directory twice. This is disadvantageous because looking up a translation in the page directory can take on the order of fifty times as long as looking up a translation in the TLB. In accordance with the present invention, a set of software instructions are introduced that enable the software to insert the translation directly into the TLB. This enables the page fault handler to insert the translation not only in the page directory, but also to insert the information into the TLB. Therefore, after completion of the page fault handler routine, instead of being assured that there will be a TLB miss, it is assured that there will be a TLB hit.

In many embodiments of computers using TLBs and cache memories, there is a cache for instructions and a separate cache for data. In addition there are separate TLBs for the instruction cache and the data cache. In such embodiments, there are separate software instructions that enable translations to be inserted directly into the data TLB and into the instruction TLB. Likewise, in some embodiments, it is advantageous for each of these capabilities to be implemented by a pair of instructions. In one particular embodiment, the first of these instructions inserts the translation between the virtual page number and its associated physical page number. The second of these instruction inserts any protection information, flags or other information that is of use for verifying the legality of the access to the page.

DESCRIPTION OF THE FIGURES

FIG. 5 illustrates the procedure, using software instructions that enable insertion of information directly into the TLB, for responding to virtual addresses that are presented during execution of a program.

DESCRIPTION OF THE PREFERRED EMBODIMENT

Figure 2:
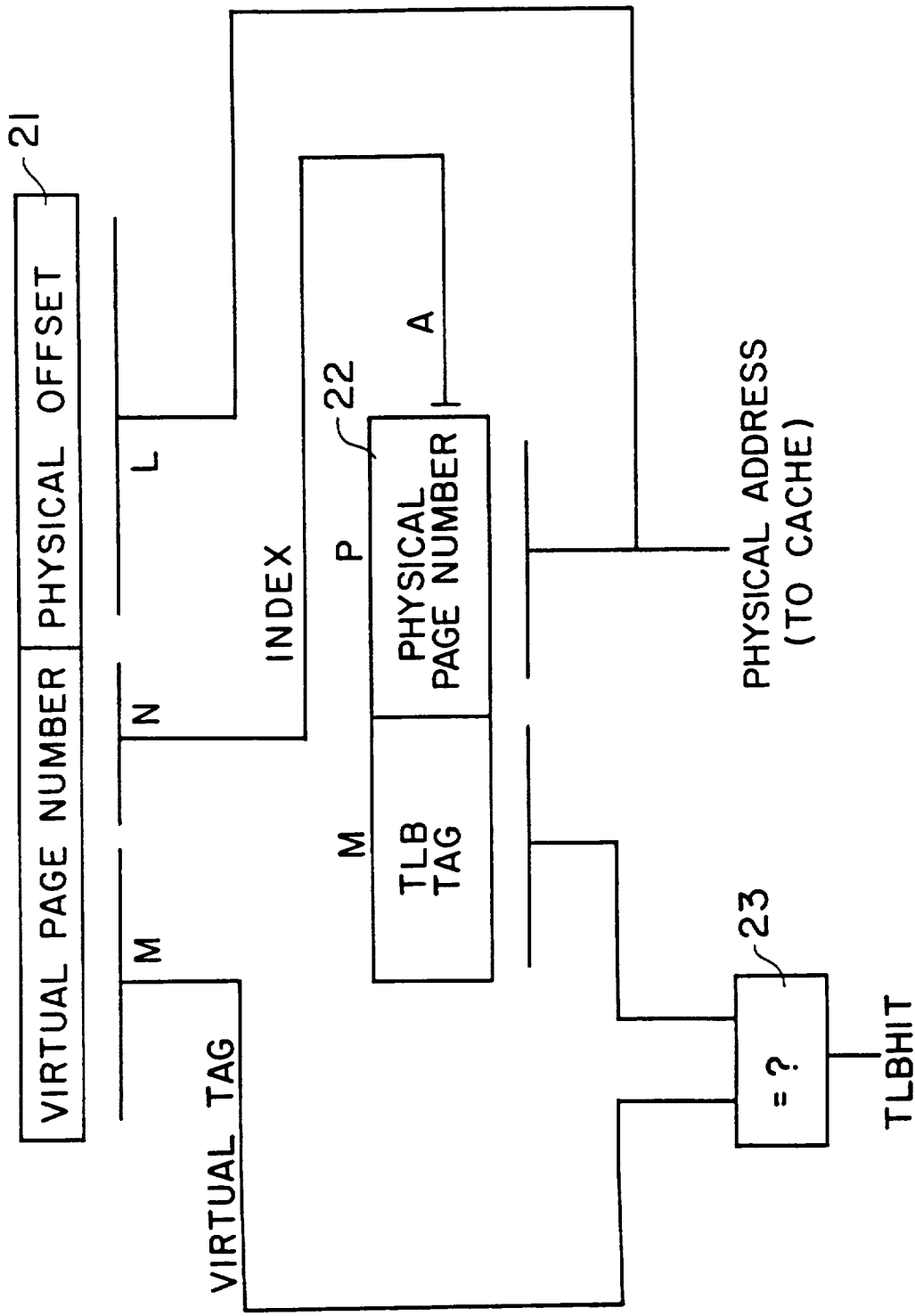
FIG. 2 illustrates access to a translation lookaside buffer.

In FIG. 2 is illustrated a method of accessing entries in a translation lookaside buffer (TLB) in response to the presentation of a virtual address. The virtual address is loaded into a register 21. The lower L bits of the virtual address are the physical offset and indicate the line number of an entry within a virtual page containing $2^L$ lines. The remaining bits in register indicate the virtual page number. In an embodiment in which a TLB 2 contains $2^N$ entries and the virtual address space contains $2^{M+N}$ pages, then some algorithm is required to convert the virtual page number to an N bit number referred to as an index. In the particular embodiment presented in FIG. 2, this is achieved by using the least significant N bits of the virtual page number. The remaining M bits of the virtual page number are referred to as a virtual tag.

The index is used as an address to access the TLB. A comparator 23 compares the virtual tag from register 21 with M bits of the TLB to see if there is a match. In this particular embodiment, the M most significant bits of the TLB form the TLB tag. If there is a match, the output of comparator 23 is true indicating that there has been a TLB hit. Otherwise, the output of comparator 23 is false indicating that there is a TLB miss. In an embodiment having $2^P$ pages of physical memory, P of the TLB bits of each TLB entry indicate the physical address for that entry. When there is a hit, these bits are used as the physical page number associated with the virtual address in register 21. The physical offset is concatenated with this physical page number to produce the physical address. Typically, in addition to the M+P TLB bits expressly shown in FIG. 2, each TLB entry also contains a set of bits to hold other information for each physical page such as protection information and flags.

Figure 3:
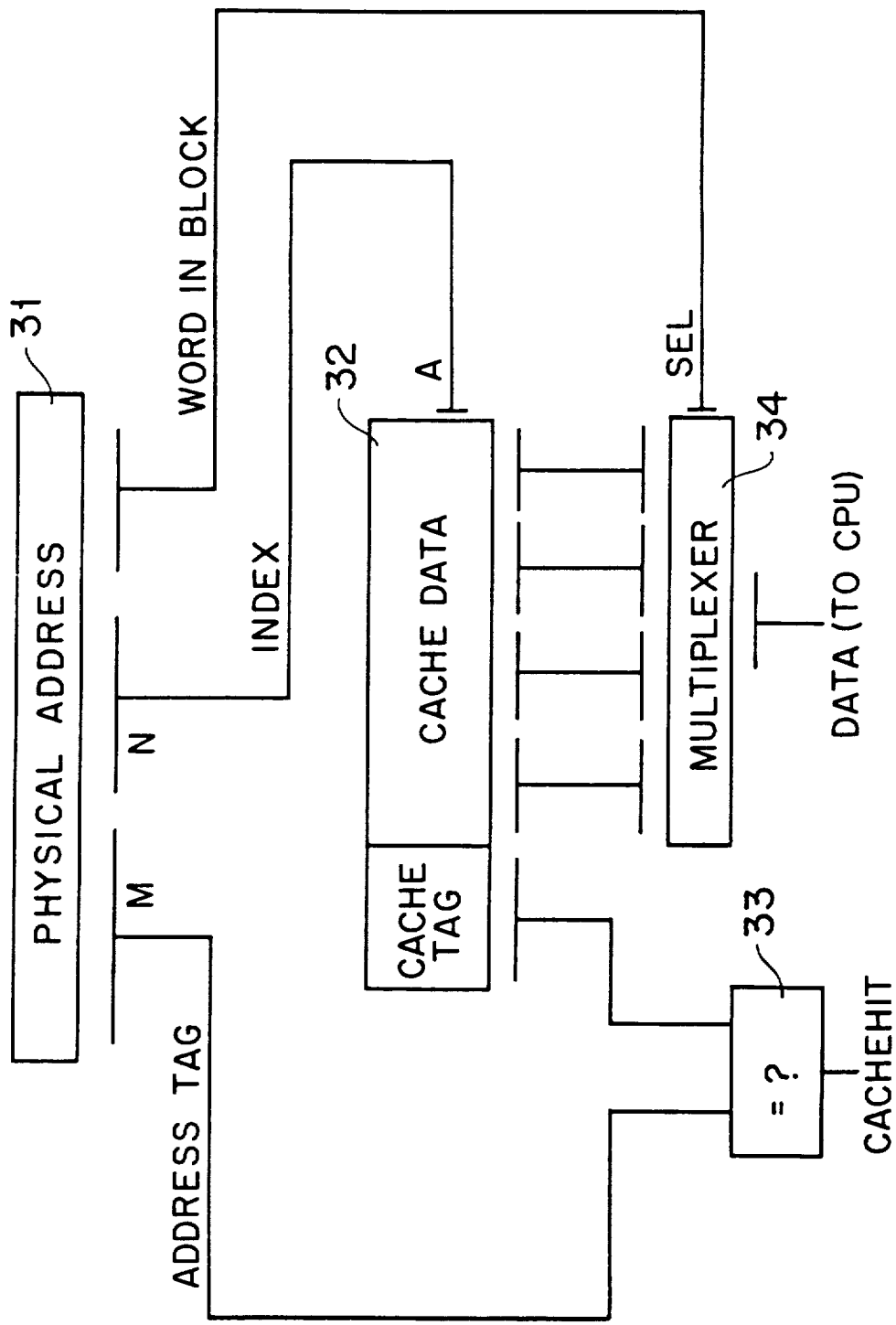
FIG. 3 illustrates access to a cache memory.

In FIG. 3 is shown how a physical address is utilized to access a cache memory 32. Each entry in cache memory 32 contains an M bit cache tag and a thirty-two bit segment of cache data. Which entry of cache 32 is selected is determined by the physical address loaded into a register 31. In this particular embodiment, a 32 bit memory is utilized so that each entry contains four words of data. In order to select among these words, the lowest two bits of the physical address are used as an input to a multiplexer 34. The next N least significant bits are referred to as the cache memory index and are used to select the address accessed in the cache memory. A comparator 33 compares the M most significant bits of register 31 with the M most significant bits of the cache memory entry at the address indicated by the cache memory index. The output of comparator 33 is true, indicating that there has been a cache memory hit, if the tag of the physical address is the same as that of the entry accessed in the cache memory. Otherwise, the output of comparator 33 is false, indicating that there has been a cache miss.

Figure 4:
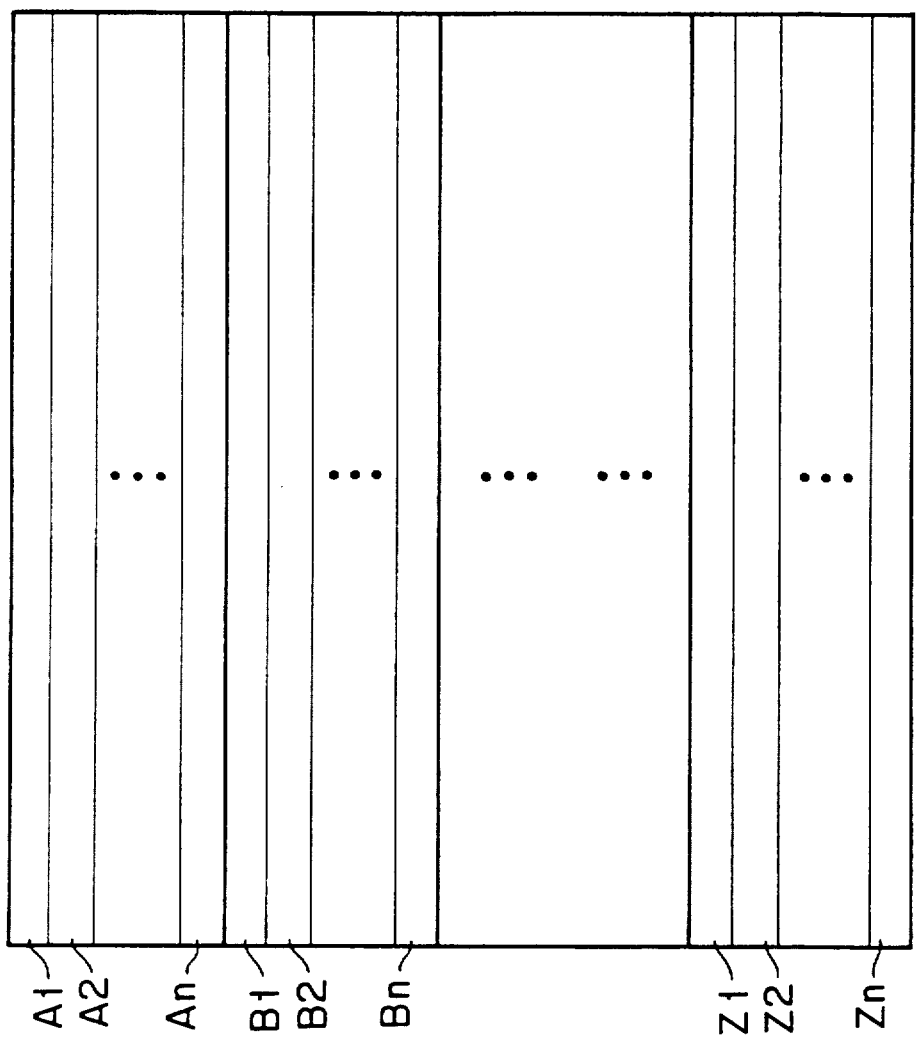
FIG. 4 illustrates access to a typical page directory.

In FIG. 4 is presented an embodiment of a page directory. To avoid having to successively look through each entry in the page directory to see if the page directory contains an entry corresponding to a given virtual address, it is advantageous to divide the entries in the page directory into sets. A hashing algorithm can be used to convert a virtual address into a pointer that points to the first entry in the set to which that virtual address belongs. In FIG. 4, the various sets are indicated by the letters A, B, ..., Z. The entries in each set form a linked list so that, instead of having to search through the entire page directory to see if a given virtual page number has been entered into the page directory, only the entries in its associated set need to be checked sequentially. If all of the entries in the associated set have been checked and none match the virtual address being sought, then this indicates that there is a page fault.

In FIG. 5 is presented a flow diagram of a procedure utilizing the components illustrated in FIGS. 2-4 to respond to the presentation of a virtual address during program execution. In step 51, the virtual address is presented by inserting the virtual address into register 21. If the translation for that virtual address is in the TLB (referred to as a TLB hit), then the associated physical address is derived from the TLB and is utilized in step 52 to access physical memory. If the translation for that virtual address is not in the TLB (referred to as a TLB miss), then in step 53 the translation for that virtual address is sought in the page directory. If the translation is in the page directory, then in step 54 this information is inserted into the TLB and the virtual address is again presented (step 51). This time we are assured of a TLB hit so that the resulting physical address is used to access physical memory.

If the virtual address is in a page of virtual addresses for which no page of physical addresses is associated, then there will be no entry for this page in the page directory. Such an occurrence is called a page fault. If there is a page fault, then in step 55 the virtual page that is referenced is assigned a physical page and this information is inserted into the page directory. If all physical pages had already been associated with other virtual pages, then the page fault handler needs to select which of the physical pages to reassign to the virtual address page currently being referenced. There are many algorithms for such a choice including first-in-first-out and least-recently-used algorithms. Because this entire process is more complicated than those routines typically implemented in microcode, the page fault handler is typically implemented in software.

Figure 1:
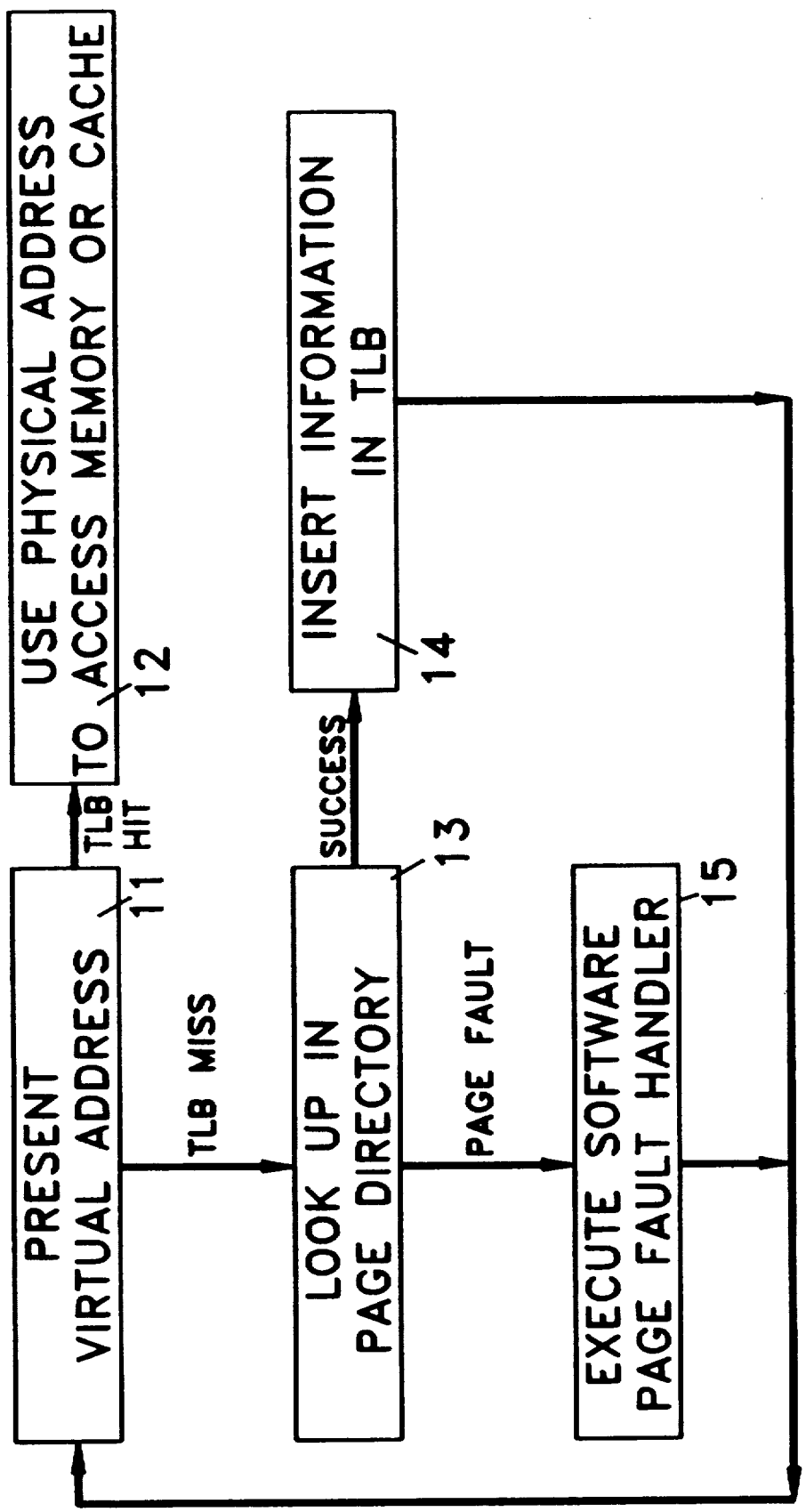
FIG. 1 presents a typical procedure for responding to virtual addresses that are presented during execution of a program.

The software includes explicit instructions that insert information into the TLB. When such an instruction is executed, the direct and definitive result is that information is inserted into the TLB. In contrast to this, in the previous methods for updating the TLB as discussed above in reference to FIG. 1, information is inserted into the TLB only as an indirect result of certain software instructions. For example, when a virtual address is presented, the information in the TLB may or may not change depending on whether there is a TLB hit or a TLB miss. Thus, there is no definitive result on the TLB as a result of the presentation of the virtual address. Explicit control over entry of information into the TLB provides a much more flexible and efficient way to control the contents of the TLB. At the end of the page fault handler routine, in addition to inserting the translation information into the page directory, the explicit software instructions for entering data into the TLB enable this information to also be inserted into the TLB (step 56). This results in a more efficient method of updating the information in the TLB. In the flow diagram of FIG. 5, at most one access of the page directory is required, whereas in the flow diagram of FIG. 5, two accesses of the page directory are required when there is a page fault. In addition, this extra control over the TLB enables the TLB contents to be changed in a more flexible manner. Multiple entries can be made under control of the software. Also, TLB entries can be preloaded to guarantee that TLB faults will not occur during critical code sections or to improve the speed of operation by reducing the number of TLB misses.

In some embodiments there will be more bits of information in each TLB entry than can be entered in response to a single software instruction. For example, in the preferred embodiment, only up to thirty-two bits of data can be moved in a single instruction cycle and all instructions are designed to operate in a single cycle. However, each TLB entry has more than thirty-two bits. Therefore, more than one explicit software instruction is required to enter all of the information.

Included in each TLB entry is a bit that indicates whether that entry is valid. Whenever that bit is set, the TLB tag for that entry will not be found by comparator 23 to match the virtual tag of any virtual address. This prevents that information from being used, but such invalid information will either be eventually marked valid when all of the information has been entered or will eventually be replaced as part of subsequent updates of the contents of the TLB. In one particular embodiment, in the response to the first explicit instruction, the virtual page number and the physical page number are inserted into the TLB. In addition, this instruction sets that entry invalid. This is done so that if the updating is interrupted at this point (for example, by a machine fault or by an external interrupt such as occur in a time shared environment), then this partial data will not be able to be utilized and create errors. When all of the information has been entered this TLB entry is marked valid. In the second explicit instruction, protection information is inserted that enables pages to be protected from unauthorized entry. The second instruction presents both the virtual address and the protection information so that the virtual address can be checked against the virtual address inserted by the first instruction to assure that no misinsertion of data occurs.

We claim:

1. A computer implemented method of updating information in a translation look-aside buffer (TLB), said method comprising the steps of:
    (a) assigning a physical page number to a virtual page number to provide a translation from this physical page number to this virtual page number;
    (b) executing at least one explicit software instruction which directs entry into said TLB of this translation from said virtual page number to said physical page number; and
    (c) as the direct and definitive response to said at least one explicit software instruction to change the contents of the TLB, without accessing a page directory, inserting said physical page number into a memory location in the TLB assigned to said virtual page number.

2. A method as in claim 1 wherein step (c) comprises the steps of:
    (c1) as the direct and definitive response to a first of said at least one explicit software instruction to change the contents of the TLB, marking said memory location as containing invalid data; and
    (c2) when all of the information to be loaded into said TLB in response to said at least one explicit software instruction has been completely loaded into said memory location, marking this location as containing valid data.

3. A method as in claim 2 wherein said first instruction causes entry of the virtual page number and its assigned physical memory page number; and wherein a second of said instructions stores protection information into the TLB.

4. A method as in claim 1 wherein said TLB is an instruction TLB.

5. A method as in claim 1 wherein said TLB is a data TLB.

6. A method as in claim 1 wherein multiple entries are made into said TLB in response to said at least one explicit software instruction.

7. A method as in claim 1 wherein at least one virtual page number to physical page number translation is preloaded into said TLB in response to said at least one explicit software instruction.

* * * * *